(12) United States Patent
Campbell et al.

(10) Patent No.: US 11,377,258 B2
(45) Date of Patent: Jul. 5, 2022

(54) CONTAINER END CLOSURE LINER AND METHODS OF PREPARING THE SAME

(71) Applicant: Novelis Inc., Atlanta, GA (US)

(72) Inventors: Ian Mussen Campbell, Göttingen (DE); Sebastijan Jurendic, Göttingen (DE)

(73) Assignee: Novelis Inc., Atlanta, GA (US)

( * ) Notice: Subject to any disclaimer, the term of this patent is extended or adjusted under 35 U.S.C. 154(b) by 250 days.

(21) Appl. No.: 16/723,049

(22) Filed: Dec. 20, 2019

(65) Prior Publication Data

US 2020/0207514 A1    Jul. 2, 2020

Related U.S. Application Data

(60) Provisional application No. 62/787,585, filed on Jan. 2, 2019.

(51) Int. Cl.
*B65D 23/02*   (2006.01)
*B65D 17/40*   (2006.01)
*B32B 37/06*   (2006.01)
*B65D 1/02*    (2006.01)
*B65D 17/28*   (2006.01)
*B65D 17/00*   (2006.01)

(52) U.S. Cl.
CPC .............. *B65D 23/02* (2013.01); *B32B 37/06* (2013.01); *B65D 1/0215* (2013.01); *B65D 17/02* (2013.01); *B65D 17/401* (2018.01); *B32B 2439/40* (2013.01)

(58) Field of Classification Search
CPC ........ B32B 37/06; B65D 23/02; B65D 23/00; B65D 1/0215; B65D 1/0207; B65D 17/401; B65D 17/02; B21D 51/2661; B21D 1/40

USPC ............ 215/12.2, 12.1, 261, 228; 220/359.3, 220/359.1, 212, 62.17, 62.16, 62.13; 156/69

See application file for complete search history.

(56) References Cited

U.S. PATENT DOCUMENTS 3,079,057 A * 2/1963 Colarusso .......... B65D 77/2024
                                                    220/359.3
3,362,574 A * 1/1968 Asmus ................... B65D 23/02
                                                    229/117.31
3,629,092 A * 12/1971 George .................... B65D 7/00
                                                    204/248

(Continued)

FOREIGN PATENT DOCUMENTS

EP       1097809    5/2001
GB       2242159    9/1991

(Continued)

OTHER PUBLICATIONS

International Application No. PCT/US2019/067812 , "International Search Report and Written Opinion", dated Apr. 22, 2020, 11 pages.

*Primary Examiner* — Robert J Hicks
(74) *Attorney, Agent, or Firm* — Kilpatrick Townsend & Stockton LLP

(57) ABSTRACT

An improved metal or glass container is described. The metal or glass container includes a body portion and an end closure. The end closure includes a laminated polymer film attached to the product facing side of the end closure. When the container is sealed, the laminated polymer film attached to the product facing side of the end closure forms a liner.

19 Claims, 1 Drawing Sheet

(56) References Cited

U.S. PATENT DOCUMENTS

| | | | | |
|---|---|---|---|---|
| 3,946,871 A * | 3/1976 | Sturm | ............... | B65D 77/2044 |
| | | | | 220/359.2 |
| 4,526,287 A * | 7/1985 | Miyamatsu | ......... | B65D 17/502 |
| | | | | 220/260 |
| 4,533,063 A * | 8/1985 | Buchner | ................. | B65D 3/22 |
| | | | | 220/270 |
| 5,738,921 A * | 4/1998 | Andersen | ............ | B28B 11/003 |
| | | | | 428/36.4 |
| 8,413,834 B2 * | 4/2013 | Oberholzer | ............. | B65D 7/36 |
| | | | | 220/619 |
| 2010/0044267 A1 * | 2/2010 | Tolibas-Spurlock | ........................ | |
| | | | | B65D 65/466 |
| | | | | 206/524.7 |
| 2014/0326725 A1 * | 11/2014 | Clarkson | ............... | B65D 50/00 |
| | | | | 220/212 |

FOREIGN PATENT DOCUMENTS

| | | |
|---|---|---|
| WO | 9834743 | 8/1998 |
| WO | 2015164703 | 10/2015 |

\* cited by examiner

CONTAINER END CLOSURE LINER AND METHODS OF PREPARING THE SAME

CROSS-REFERENCE TO RELATED APPLICATION

The present application claims priority to and filing benefit of U.S. Provisional Patent Application No. 62/787,585, filed on Jan. 2, 2019, which is incorporated herein by reference in its entirety.

TECHNICAL FIELD

The present disclosure relates to metalworking generally and more specifically to laminating metal strips and preparing metal containers therefrom. The present disclosure also relates to non-metal containers, such as glass bottles.

BACKGROUND

Certain metal products, such as aluminum beverage cans, may require a protective layer between the metal and its contents. For example, beverage cans often must provide sufficient protection between the metal of the beverage can and the beverage contained therein to avoid damage to the metal from harsh beverages, such as sodas and colas, as well as to avoid undesirable effects to the beverage, such as discoloration or change in taste.

Methods of providing a liner in a seam of a metal container include spraying a compound liner onto a curl of a metal container end. The compound liner then forms an edge seal when the metal container is sealed (e.g., when a can is seamed). Problems of current methods include cost, compound placement (e.g., product spoilage due to misaligned spray guns and overspray allowing the product to contact the metal), curing of the compound, presence of solvents, incorporating chlorine-containing polymers (e.g., polyvinyl chloride), equipment maintenance, and high energy consumption.

SUMMARY

Covered embodiments of the invention are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Disclosed herein is a container, including a body having a sealable opening, a product facing body side, and a consumer facing body side; and an end closure including a product facing closure side and a consumer facing closure side, wherein the sealable opening is configured to receive the end closure, wherein the product facing closure side comprises a laminated film, and wherein the laminated film on the product facing closure side contacts the product facing body side providing an end. In some cases, the container can be a beverage can, a glass bottle, a food storage can, an aerosol can, or a chemical storage can. In some aspects, the container can be a metal container comprising aluminum, an aluminum alloy, magnesium, a magnesium-based material, titanium, a titanium-based material, copper, a copper-based material, steel, a steel-based material, bronze, a bronze-based material, brass, a brass-based material, or any combination thereof.

In certain aspects, the body includes a spray on liner, a laminated liner, a chemical vapor deposited liner, a physical vapor deposited liner, an applicator applied liner (e.g., a brush-on liner or a swab-on liner), or any combination thereof. Additionally, the end closure can be an easy open closure, a peel off closure, a beverage closure, a penny lever closure, a sanitary closure, an aerosol valve cap closure, a ring pull closure, a resealable closure, a bottle closure, or any combination thereof. As such, the end closure can be configured to engage the sealable opening. In some non-limiting examples, the laminated film can be a natural polymer, a synthetic polymer, or any combination thereof. In some cases, the end closure liner is up to 40 microns thick (e.g., the end closure liner is from 4 microns to 22 microns thick, from 6 microns thick to 500 microns thick, or from 8 microns thick to 15 microns thick). Additionally, the end closure liner can be resistant to materials having a pH of from 1 to 14, and can provide a product shelf life of up to four years. Also described herein is a method for preparing a container having an end closure liner, including providing a body comprising a sealable opening, a product facing body side, and a consumer facing body side; providing an end closure stock, wherein the end closure stock comprises a product facing closure side, and a consumer facing closure side; laminating the product facing closure side of the end closure stock with a polymer film; forming an end closure from the end closure stock; and sealing the body with the end closure to provide a sealed container.

In some cases, the polymer film comprises a polyester film, e.g., a polyethylene terephthalate (PET) film. As such, laminating the product facing closure side of the end closure stock with a polymer film includes laminating a polyethylene terephthalate film to the product facing closure side of the end closure stock. In some cases, laminating the product facing closure side of the end closure stock with a polymer film includes heating the polymer film to a temperature of at least 200° C., contacting the product facing closure side of the end closure stock with the polymer film, and maintaining the polymer film at the temperature of at least 200° C. for 1 second to 30 seconds. In certain examples, the method further includes annealing the sealed container, wherein annealing the sealed container includes raising a temperature of the polymer film for a duration sufficient to melt the polymer film into a surface texture of the sealed container. For example, annealing the sealed container can include raising a temperature of the polymer film to at least 230° C. In some cases, annealing the sealed container bonds the polymer film of the body to the polymer film of the end closure.

In some examples, forming the end closure comprises forming an easy open closure, a peel off closure, a beverage closure, a penny lever closure, a sanitary closure, an aerosol valve cap closure, a ring pull closure, a resealable closure, a bottle rolled-on pilfer proof (ROPP) closure, or any combination thereof. In certain aspects, sealing the body with the end closure comprises contacting the polymer film with the body and providing an air-tight closure.

DETAILED DESCRIPTION

Figure 1:
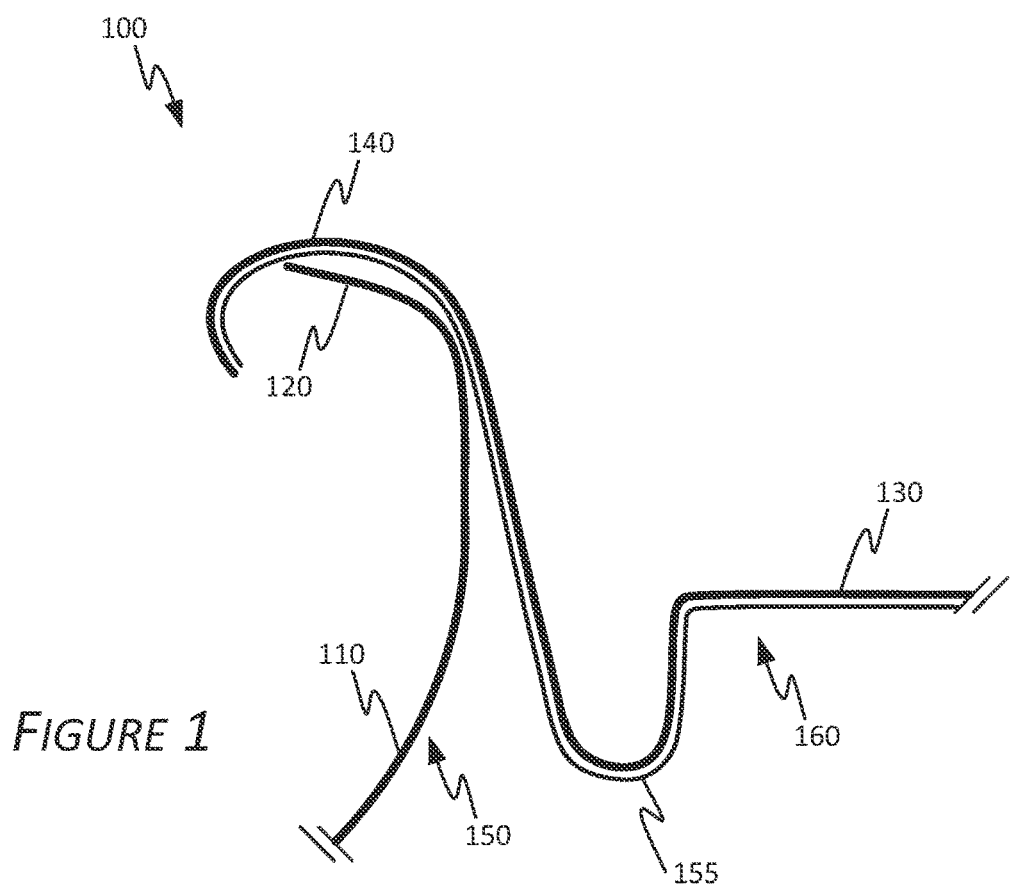
FIG. 1 is a schematic depicting a metal container sealing configuration as described herein.

Disclosed herein are improved end closures for containers (e.g., metal and glass containers) and methods for preparing the same. The end closures described herein address the problems associated with existing containers and their preparation methods. For example, end closures for containers described herein can be prepared at a lower cost with lower energy consumption than existing containers. In addition, the methods for preparing the end closures do not suffer from compound application issues, such as misalignment and overspray, because the end closures described herein include a liner that is applied without the need for spraying. Further, the end closures described herein for use on the metal container are continuous (i.e., covering the entirety of an end closure) and are sustainable.

The container includes a body portion and the end closure. The end closure includes a laminated polymer film attached to the product side of the end closure. When the container is sealed (e.g., seamed), the laminated polymer film attached to the product side of the end closure contacts the product side of the body (or, in some examples, a coating provided thereon), providing an end closure liner.

Definitions and Descriptions

As used herein, the terms "invention," "the invention," "this invention," and "the present invention" are intended to refer broadly to all of the subject matter of this patent application and the claims below. Statements containing these terms should be understood not to limit the subject matter described herein or to limit the meaning or scope of the patent claims below.

In this description, reference is made to alloys identified by aluminum industry designations, such as "series" or "5xxx." For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

Aluminum alloys are described herein in terms of their elemental composition in weight percentage (wt. %) based on the total weight of the alloy. In certain examples of each alloy, the remainder is aluminum, with a maximum wt. % of 0.15% for the sum of the impurities.

Reference is made in this application to alloy temper or condition. For an understanding of the alloy temper descriptions most commonly used, see "American National Standards (ANSI) H35 on Alloy and Temper Designation Systems." An F condition or temper refers to an aluminum alloy as fabricated. An O condition or temper refers to an aluminum alloy after annealing. An Hxx condition or temper, also referred to herein as an H temper, refers to an aluminum alloy after cold rolling with or without thermal treatment (e.g., annealing). Suitable H tempers include HX1, HX2, HX3 HX4, HX5, HX6, HX7, HX8, or HX9 tempers. For example, the aluminum alloy can be cold rolled to result in a possible H19 temper. In a further example, the aluminum alloy can be cold rolled and annealed to result in a possible H23 temper.

As used herein, terms such as "cast metal article," "cast article," and the like are interchangeable and refer to a product produced by direct chill casting (including direct chill co-casting) or semi-continuous casting, continuous casting (including, for example, by use of a twin belt caster, a twin roll caster, a block caster, or any other continuous caster), electromagnetic casting, hot top casting, or any other casting method.

As used herein, a plate generally has a thickness of greater than about 15 mm. For example, a plate may refer to an aluminum product having a thickness of greater than about 15 mm, greater than about 20 mm, greater than about 25 mm, greater than about 30 mm, greater than about 35 mm, greater than about 40 mm, greater than about 45 mm, greater than about 50 mm, greater than about 100 mm, or up to about 200 mm.

As used herein, a shate (also referred to as a sheet plate) generally has a thickness of from about 4 mm to about 15 mm. For example, a shate may have a thickness of about 4 mm, about 5 mm, about 6 mm, about 7 mm, about 8 mm, about 9 mm, about 10 mm, about 11 mm, about 12 mm, about 13 mm, about 14 mm, or about 15 mm.

As used herein, a sheet generally refers to an aluminum product having a thickness of less than about 4 mm. For example, a sheet may have a thickness of less than about 4 mm, less than about 3 mm, less than about 2 mm, less than about 1 mm, less than about 0.5 mm, or less than about 0.3 mm (e.g., about 0.2 mm).

As used herein, the meaning of "a," "an," or "the" includes singular and plural references unless the context clearly dictates otherwise.

As used herein, the meaning of "room temperature" can include a temperature of from about 15° C. to about 30° C., for example about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C.

All ranges disclosed herein are to be understood to encompass any and all endpoints, and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10.

As used herein, the term "polymer" is inclusive of homopolymers and copolymers. Homopolymer refers to a polymer derived from a single polymerizable monomer. Copolymer refers to a polymer derived from two or more polymerizable monomers.

Containers

Described herein is a metal or glass container, including a body (e.g., a metal container body or a glass bottle body) having a sealable opening, a product facing body side (e.g., an inside), and a consumer facing body side (e.g., an outside). The metal or glass container further includes an end closure having a product facing closure side and a consumer facing closure side. The sealable opening is configured to receive the end closure, and likewise, the end closure is configured to engage the sealable opening.

The metal container can be prepared from any suitable metal article. In some examples, the metal container includes aluminum, an aluminum alloy, magnesium, a magnesium-based material, titanium, a titanium-based material, copper, a copper-based material, steel, a steel-based material, bronze, a bronze-based material, brass, a brass-based material, a composite, a sheet used in composites, or any other suitable metal or combination of materials. The metal article may include monolithic materials, as well as non-monolithic materials such as roll-bonded materials, clad materials, composite materials (such as, but not limited to, carbon fiber-containing materials), or various other materials. In some examples, the metal article used to prepare the metal container can be a metal coil, a metal strip, a metal plate, a metal sheet, a metal billet, a metal ingot, or the like. In some cases, the methods described herein can be applied to a non-metal article.

In some cases, the metal article for use in preparing the metal container is an aluminum alloy, such as a 1xxx series aluminum alloy, a 3xxx series aluminum alloy, or a 5xxx series aluminum alloy. By way of non-limiting example, exemplary 1xxx series aluminum alloys can include AA1100, AA1100A, AA1200, AA1200A, AA1300, AA1110, AA1120, AA1230, AA1230A, AA1235, AA1435, AA1145, AA1345, AA1445, AA1150, AA1350, AA1350A, AA1450, AA1370, AA1275, AA1185, AA1285, AA1385, AA1188, AA1190, AA1290, AA1193, AA1198, and AA1199.

By way of non-limiting example, exemplary 3xxx series aluminum alloys can include AA3002, AA3102, AA3003, AA3103, AA3103A, AA3103B, AA3203, AA3403, AA3004, AA3004A, AA3104, AA3204, AA3304, AA3005, AA3005A, AA3105, AA3105A, AA3105B, AA3007, AA3107, AA3207, AA3207A, AA3307, AA3009, AA3010, AA3110, AA3011, AA3012, AA3012A, AA3013, AA3014, AA3015, AA3016, AA3017, AA3019, AA3020, AA3021, AA3025, AA3026, AA3030, AA3130, and AA3065.

Non-limiting exemplary 5xxx series aluminum alloys can include AA5005, AA5005A, AA5205, AA5305, AA5505, AA5605, AA5006, AA5106, AA5010, AA5110, AA5110A, AA5210, AA5310, AA5016, AA5017, AA5018, AA5018A, AA5019, AA5019A, AA5119, AA5119A, AA5021, AA5022, AA5023, AA5024, AA5026, AA5027, AA5028, AA5040, AA5140, AA5041, AA5042, AA5043, AA5049, AA5149, AA5249, AA5349, AA5449, AA5449A, AA5050, AA5050A, AA5050C, AA5150, AA5051, AA5051A, AA5151, AA5251, AA5251A, AA5351, AA5451, AA5052, AA5252, AA5352, AA5154, AA5154A, AA5154B, AA5154C, AA5254, AA5354, AA5454, AA5554, AA5654, AA5654A, AA5754, AA5854, AA5954, AA5056, AA5356, AA5356A, AA5456, AA5456A, AA5456B, AA5556, AA5556A, AA5556B, AA5556C, AA5257, AA5457, AA5557, AA5657, AA5058, AA5059, AA5070, AA5180, AA5180A, AA5082, AA5182, AA5083, AA5183, AA5183A, AA5283, AA5283A, AA5283B, AA5383, AA5483, AA5086, AA5186, AA5087, AA5187, and AA5088.

Container Closures

In some non-limiting examples, the end closure described herein is an aluminum can end stock (CES) product. CES as used herein refers to an aluminum alloy formed to a shape to serve as a closure for an aluminum can. In some cases, the closure may include a scored orifice that can be broken by a consumer to form an opening in the can end to retrieve any product stored within the can. In some non-limiting examples, the end closure can be an easy open closure (e.g., a ring pull closure), a peel off closure (e.g., a thin foil closure), a beverage closure or seam (e.g., a double seam), a penny lever closure (e.g., a drum closure, or a paint can closure), a sanitary closure (e.g., a closure opened by cutting with, for example, a can opener), an aerosol valve cap closure, a ring pull closure, any suitable container end closure, or any combination thereof. In some cases, the closure can be a resealable closure. For example, the resealable closure can be a threaded closure (e.g., a twist-off cap), a bottle rolled-on pilfer proof closure, a clamp closure, a hinged closure, a snap-on closure, or any combination thereof.

Container Bodies

In some non-limiting examples, the metal or glass container can have any suitable body shape, including a cylinder, a cube, a cuboid, a sphere, a cone, a tetrahedron, a pyramid, any other suitable three-dimensional (3-D) shape, or any combination thereof. Accordingly, the CES product can be formed into any shape suitable to form a closure for the container body. For example, the closure for the container body can be a disc (e.g., to seal a cylinder), a square (e.g., to seal a cube), a rectangle (e.g., to seal a cuboid), a hemisphere (e.g., to seal a sphere), a cone top (e.g., to seal a cone), a tetrahedron top (e.g., to seal a tetrahedron), a pyramid top (e.g., to seal a pyramid), any suitable closure that is complementary to a body (e.g., a closure that completes the shape of the body when joined together), or any combination thereof.

The container can be a beverage can (e.g., a soda can, a water can, an alcoholic beverage can, any pressurized beverage can, or any non-pressurized beverage can), a glass bottle (e.g., a water bottle, a soda bottle, an alcoholic beverage bottle, a chemical storage bottle, or the like), a food storage can (e.g., a canned vegetable can, a canned meat can, a sardine can, a pet food can, or an emergency provisions can), an aerosol can (e.g., a cooking spray can, a hairspray can, a lubricant can, or a whipped product can), a chemical storage can (e.g., a weak acid storage can, a weak base storage can, a solvent storage can, or any chemical suitable for use with a polymer film liner, such as a chemical that does not degrade the polymer film), any suitable metal container, or any combination thereof.

Container Liners

A barrier is needed to prevent the product stored within the can from touching, for example, an aluminum alloy of an aluminum can. Additionally, the barrier needs to extend into a seam created when sealing the metal container (e.g., a seam created about the openable end of an aluminum beverage can), such that the risk of exposing the product to the aluminum alloy is significantly reduced. The barrier can function to prevent a release of carbon dioxide (e.g., when the metal container contains carbonated beverages) and/or nitrogen gases (e.g., when the metal container contains nitrogen infused beverages) from the metal container. The barrier can also prevent oxygen from entering the metal container. In some non-limiting examples, the metal container body has a product facing side (e.g., an interior facing side, or the inside) having a coating disposed thereon.

As described herein, an end closure created from a CES product described above has a product facing side having a polymer film laminated thereon. As such, the metal container body is configured to receive the end closure. Additionally, the end closure is configured to engage the metal container body. For example, in a seaming configuration 100, as shown in FIG. 1, the metal container body 110 can have a lip 120, and the end closure 130 can have a protruding edge, for example, a curl 140 configured to wrap around the lip 120. Wrapping the curl 140 around the lip 120 in a seaming step provides a closure (e.g., a seam of an aluminum beverage can).

In a comparative example, a compound, as described above, is sprayed into the curl 140 prior to the seaming step to provide the barrier described above. Spraying the compound into the curl 140 can result in the problems described above, including high cost, compound placement issues (e.g., product spoilage due to misaligned spray guns and overspray allowing the product to contact the metal, and/or allowing gases to escape the container), energy and economic costs associated with curing the compound, presence of volatile organic compounds (e.g., solvents), using chlorine-containing polymers (e.g., polyvinyl chloride), and the energy and economic costs associated with equipment maintenance.

Figure 2:
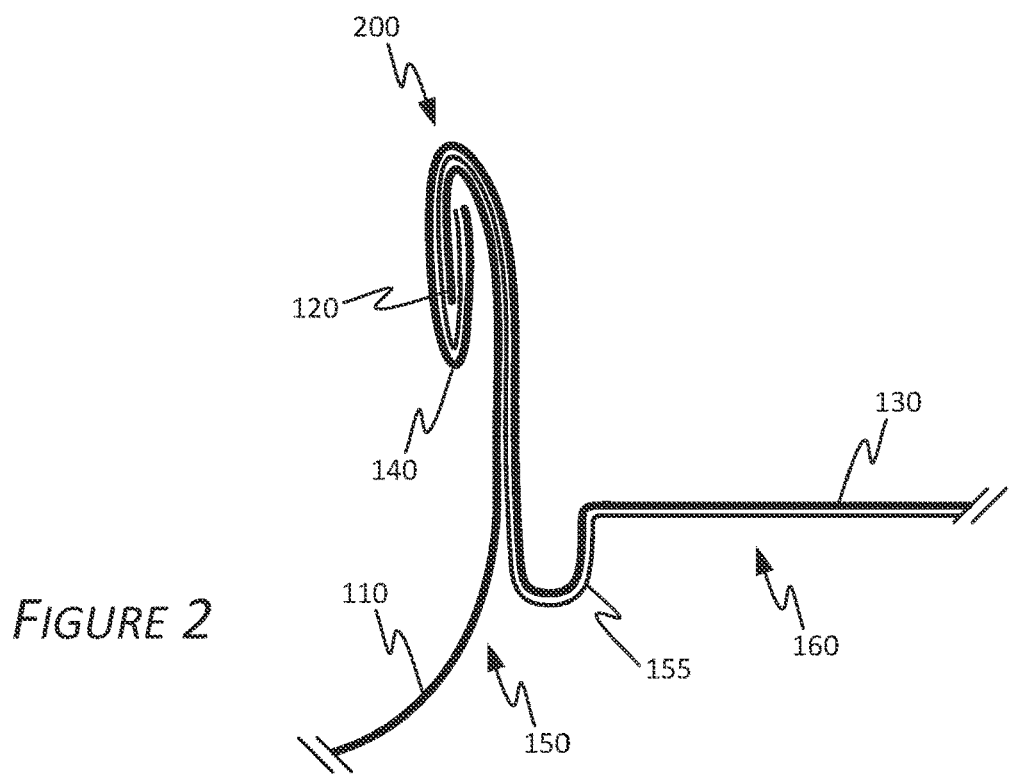
FIG. 2 is a schematic depicting a sealed metal container configuration as described herein.

As described herein, in the example of a CES product having a polymer film laminated thereon, a product side of the container body 150 is configured to contact the laminated polymer film 155 on a product side of the end closure 160. In some examples, the laminated polymer film on the product side of the end closure 160 is configured to contact the product side of the container body 150. For example, the laminated polymer film on the product side of the end closure 160 can extend to the curl 140 such that any portion of the cud 140 contacting the lip 120 contains the laminated polymer film. Thus, sealing the container with the end closure 130 having the laminated polymer film 155 on the product facing side of the end closure 160 further provides an end closure liner about a seam 200, as shown in FIG. 2. In the example of FIG. 2, the end closure 130 and metal container body 110 were subjected to a seaming process providing the seam 200. The curl 140 was wrapped about the 120 and the curl 140 and lip 120 were compressed to provide the seam 200.

In some examples, the polymer film can include a natural polymer or a synthetic polymer. In some non-limiting examples, the polymer film can be prepared from a homopolymer or a copolymer. Suitable homopolymers include polyesters (e.g., polyethylene terephthalate (PET)), epoxies, polyurethanes, polyvinyls, polyacrylics, polyamides, polyolefins, and silicones. In some cases, the polyesters can be hot melt polyesters. In some cases, the polymer film can include copolymers. Suitable copolymers as described herein include block copolymers, random copolymers, graft copolymers, copolymer blends, statistical copolymers, periodic copolymers, alternating copolymers, star copolymers, starblock copolymers, and/or any combinations thereof. The copolymers can be configured as head-to-head copolymers and/or as head-to-tail copolymers. The copolymers can have any suitable structure, or be any suitable isomer thereof (e.g., cis isomers or trans isomers).

Optionally, the polymer film can be a polyester film. In some cases, the polyester film can be a hot melt polyester film. Optionally, the polymer film can be a polyethylene terephthalate (PET) film. In some examples, the PET film includes a polymer derived from ethylene glycol, terephthalic acid, or a terephthalate-containing compound, and optionally one or more additional comonomers. The one or more additional comonomers can be used to tailor the properties of the film, such as the melting temperature. Exemplary comonomers for use as the additional comonomers can include isophthalic acid, butylene diol, 2-methyl-1,3-propanediol, phthalate, 1,8-naphthalenedicarboxylate, and 1,8-anthracenedicarboxylate, to name a few. Optionally, the polymer film includes a polyethylene naphthalate film.

Suitable polymers for use as the polymer film can have a weight average molecular weight (Mw) of the copolymers between about 10,000 grams per mole (g/mol) and about 500,000 g/mol. For example, the Mw can be from about 20,000 g/mol to about 400,000 g/mol; from about 30,000 g/mol to about 300,000 g/mol; or from about 40,000 g/mol to about 100,000 g/mol, or any value in between. For example, the Mw can be 10,000 g/mol, 20,000 g/mol, 30,000 g/mol, 40,000 g/mol, 50,000 g/mol, 60,000 g/mol, 70,000 g/mol, 80,000 g/mol, 90,000 g/mol, 100,000 g/mol, 110,000 g/mol, 120,000 g/mol, 130,000 g/mol, 140,000 g/mol, 150,000 g/mol, 160,000 g/mol, 170,000 g/mol, 180,000 g/mol, 190,000 g/mol, 200,000 g/mol, 210,000 g/mol, 220,000 g/mol, 230,000 g/mol, 240,000 g/mol, 250,000 g/mol, 260,000 g/mol, 270,000 g/mol, 280,000 g/mol, 290,000 g/mol, 300,000 g/mol, 310,000 g/mol, 320,000 g/mol, 330,000 g/mol, 340,000 g/mol, 350,000 g/mol, 360,000 g/mol, 370,000 g/mol, 380,000 g/mol, 390,000 g/mol, 400,000 g/mol, 410,000 g/mol, 420,000 g/mol, 430,000 g/mol, 440,000 g/mol, 450,000 g/mol, 460,000 g/mol, 470,000 g/mol, 480,000 g/mol, 490,000 g/mol, or 500,000 g/mol.

In certain aspects, the polymer film can have a thickness up to about 500 microns (nm) (e.g., from about 1 nm to about 400 nm, from about 2 nm to about 300 nm, from about 3 nm to about 200 nm, from about 4 nm to about 100 nm, from about 5 nm to about 50 nm, from about 4 nm to about 35 nm, from about 6 nm to about 22 µm, from about 9 nm to about 18 nm, from about 12 nm to about 15 nm, from about 7 nm to about 21 nm, from about 8 nm to about 20 nm, from about 9 nm to about 19 nm, from about 10 nm to about 18 nm, from about 11 nm to about 17 nm, from about 12 nm to about 16 nm, or from about 13 nm to about 15 nm). For example, the polymer film can have a thickness of about 0.5 nm, about 1 nm, about 2 nm, about 3 nm, about 4 nm, about 5 nm, about 6 nm, about 7 nm, about 8 nm, about 9 nm, about 10 nm, about 11 µm, about 12 nm, about 13 nm, about 14 nm, about 15 nm, about 16 nm, about 17 nm, about 18 nm, about 19 nm, about 20 nm, about 21 nm, about 22 nm, about 23 nm, about 24 nm, about 25 nm, about 26 nm, about 27 nm, about 28 nm, about 29 nm, about 30 nm, about 31 nm, about 32 nm, about 33 nm, about 34 nm, about 35 nm, about 36 nm, about 37 nm, about 38 nm, about 39 nm, about 40 nm, about 41 nm, about 42 nm, about 43 nm, about 44 nm, about 45 nm, about 46 nm, about 47 nm, about 48 nm, about 49 nm, about 50 nm, about 51 nm, about 52 nm, about 53 nm, about 54 nm, about 55 nm, about 56 nm, about 57 nm, about 58 nm, about 59 nm, about 60 nm, about 61 nm, about 62 nm, about 63 nm, about 64 nm, about 65 nm, about 66 nm, about 67 nm, about 68 nm, about 69 nm, about 70 nm, about 71 nm, about 72 nm, about 73 nm, about 74 nm, about 75 nm, about 76 nm, about 77 nm, about 78 nm, about 79 nm, about 80 nm, about 81 nm, about 82 nm, about 83 nm, about 84 nm, about 85 nm, about 86 nm, about 87 nm, about 88 nm, about 89 nm, about 90 nm, about 91 nm, about 92 nm, about 93 nm, about 94 nm, about 95 nm, about 96 nm, about 97 nm, about 98 nm, about 99 nm, about 100 nm, about 101 nm, about 102 nm, about 103 µm, about 104 nm, about 105 nm, about 106 nm, about 107 nm, about 108 nm, about 109 nm, about 110 nm, about 111 nm, about 112 µm, about 113 µm, about 114 nm, about 115 µm, about 116 nm, about 117 µm, about 118 nm, about 119 nm, about 120 µm, about 121 nm, about 122 µm, about 123 nm, about 124 nm, about 125 nm, about 126 nm, about 127 nm, about 128 nm, about 129 nm, about 130 nm, about 131 µm, about 132 µm, about 133 nm, about 134 µm, about 135 nm, about 136 µm, about 137 nm, about 138 nm, about 139 µm, about 140 nm, about 141 µm, about 142 nm, about 143 nm, about 144 nm, about 145 nm, about 146 nm, about 147 µm, about 148 µm, about 149 µm, about 150 µm, about 151 µm, about 152 µm, about 153 µm, about 154 µm, about 155 µm, about 156 µm, about 157 µm, about 158 µm, about 159 µm, about 160 µm, about 161 µm, about 162 µm, about 163 µm, about 164 µm, about 165 µm, about 166 µm, about 167 µm, about 168 µm, about 169 µm, about 170 µm, about 171 µm, about 172 µm, about 173 µm, about 174 µm, about 175 µm, about 176 µm, about 177 µm, about 178 µm, about 179 µm, about 180 µm, about 181 µm, about 182 µm, about 183 µm, about 184 µm, about 185 µm, about 186 µm, about 187 µm, about 188 µm, about 189 µm, about 190 µm, about 191 µm, about 192 µm, about 193 µm, about 194 µm, about 195 µm, about 196 µm, about 197 µm, about 198 µm, about 199 µm, about 200 µm, about 201 µm, about 202 µm, about 203 µm, about 204 µm, about 205 µm, about 206 µm, about 207 µm, about 208 µm, about 209 µm, about 210 µm, about 211 µm, about 212 µm, about 213 µm, about 214 µm, about 215 µm, about 216 µm, about 217 µm, about 218 µm, about 219 µm, about 220 µm, about 221 µm, about 222 µm, about 223 µm, about 224 µm, about 225 µm, about 226 µm, about 227 µm, about 228 µm, about 229 µm, about 230 µm, about 231 µm, about 232 µm, about 233 µm, about 234 µm, about 235 µm, about 236 µm, about 237 µm, about 238 µm, about 239 µm, about 240 µm, about 241 µm, about 242 µm, about 243 µm, about 244 µm, about 245 µm, about 246 µm, about 247 µm, about 248 µm, about 249 µm, about 250 µm, about 251 µm, about 252 µm, about 253 µm, about 254 µm, about 255 µm, about 256 µm, about 257 µm, about 258 µm, about 259 µm, about 260 µm, about 261 µm, about 262 µm, about 263 µm, about 264 µm, about 265 µm, about 266 µm, about 267 µm, about 268 µm, about 269 µm, about 270 µm, about 271 µm, about 272 µm, about 273 µm, about 274 µm, about 275 µm, about 276 µm, about 277 µm, about 278 µm, about 279 µm, about 280 µm, about 281 µm, about 282 µm, about 283 µm, about 284 µm, about 285 µm, about 286 µm, about 287 µm, about 288 µm, about 289 µm, about 290 µm, about 291 µm, about 292 µm, about 293 µm, about 294 µm, about 295 µm, about 296 µm, about 297 µm, about 298 µm, about 299 µm, about 300 µm, about 301 µm, about 302 µm, about 303 µm, about 304 µm, about 305 µm, about 306 µm, about 307 µm, about 308 µm, about 309 µm, about 310 µm, about 311 µm, about 312 µm, about 313 µm, about 314 µm, about 315 µm, about 316 µm, about 317 µm, about 318 µm, about 319 µm, about 320 µm, about 321 µm, about 322 µm, about 323 µm, about 324 µm, about 325 µm, about 326 µm, about 327 µm, about 328 µm, about 329 µm, about 330 µm, about 331 µm, about 332 µm, about 333 µm, about 334 µm, about 335 µm, about 336 µm, about 337 µm, about 338 µm, about 339 µm, about 340 µm, about 341 µm, about 342 µm, about 343 µm, about 344 µm, about 345 µm, about 346 µm, about 347 µm, about 348 µm, about 349 µm, about 350 µm, about 351 µm, about 352 µm, about 353 µm, about 354 µm, about 355 µm, about 356 µm, about 357 µm, about 358 µm, about 359 µm, about 360 µm, about 361 µm, about 362 µm, about 363 µm, about 364 µm, about 365 µm, about 366 µm, about 367 µm, about 368 µm, about 369 µm, about 370 µm, about 371 µm, about 372 µm, about 373 µm, about 374 µm, about 375 µm, about 376 µm, about 377 µm, about 378 µm, about 379 µm, about 380 µm, about 381 µm, about 382 µm, about 383 µm, about 384 µm, about 385 µm, about 386 µm, about 387 µm, about 388 µm, about 389 µm, about 390 µm, about 391 µm, about 392 µm, about 393 µm, about 394 µm, about 395 µm, about 396 µm, about 397 µm, about 398 µm, about 399 µm, about 400 µm, about 401 µm, about 402 µm, about 403 µm, about 404 µm, about 405 µm, about 406 µm, about 407 µm, about 408 µm, about 409 µm, about 410 µm, about 411 µm, about 412 µm, about 413 µm, about 414 µm, about 415 µm, about 416 µm, about 417 µm, about 418 µm, about 419 µm, about 420 µm, about 421 µm, about 422 µm, about 423 µm, about 424 µm, about 425 µm, about 426 µm, about 427 µm, about 428 µm, about 429 µm, about 430 µm, about 431 µm, about 432 µm, about 433 µm, about 434 µm, about 435 µm, about 436 µm, about 437 µm, about 438 µm, about 439 µm, about 440 µm, about 441 µm, about 442 µm, about 443 µm, about 444 µm, about 445 µm, about 446 µm, about 447 µm, about 448 µm, about 449 µm, about 450 µm, about 451 µm, about 452 µm, about 453 µm, about 454 µm, about 455 µm, about 456 µm, about 457 µm, about 458 µm, about 459 µm, about 460 µm, about 461 µm, about 462 µm, about 463 µm, about 464 µm, about 465 µm, about 466 µm, about 467 µm, about 468 µm, about 469 µm, about 470 µm, about 471 µm, about 472 µm, about 473 µm, about 474 µm, about 475 µm, about 476 µm, about 477 µm, about 478 µm, about 479 µm, about 480 µm, about 481 µm, about 482 µm, about 483 µm, about 484 µm, about 485 µm, about 486 µm, about 487 µm, about 488 µm, about 489 µm, about 490 µm, about 491 µm, about 492 µm, about 493 µm, about 494 µm, about 495 µm, about 496 µm, about 497 µm, about 498 µm, about 499 µm, or about 500 µm, or anywhere in between.

In some non-limiting examples, the end closure liner is resistant to (e.g., does not degrade in the presence of) nitrogen gas, carbon dioxide, acidic materials, alkaline materials, solvents, corrosive materials, or materials having a pH of from about 1 to about 14 (e.g., from about 2 to about 13, from about 3 to about 12, from about 4 to about 11, from about 5 to about 10, from about 6 to about 9, or from about 7 to about 8). For example, the end closure liner is resistant to materials having a pH of about 1, 2, 3, 4, 5, 6, 7, 8, 9, 10, 11, 12, 13, 14, or anywhere in between. In some cases, the end closure liner is resistant to alcoholic liquids (e.g., alcoholic beverages, solvents, or the like). For example, the end closure liner is resistant to alcoholic liquids containing up to about 50 percent by volume (vol. %) alcohol (e.g., from about to about 4 vol. % to about 40 vol. %, from about 6 vol. % to about 50 vol. %, from about 8 vol. % to about 40 vol. %, from about 10 vol. % to about 35 vol. %, from about 12 vol. % to about 25 vol. %, or from about 15 vol. % to about 20 vol. %). For example, the end closure liner is resistant to alcoholic liquids containing an amount of alcohol of about 1 vol. %, 2 vol. %, 3 vol. %, 4 vol. %, 5 vol. %, 6 vol. %, 7 vol. %, 8 vol. %, 9 vol. %, 10 vol. %, 11 vol. %, 12 vol. %, 13 vol. %, 14 vol. %, 15 vol. %, 16 vol. %, 17 vol. %, 18 vol. %, 19 vol. %, 20 vol. %, 21 vol. %, 22 vol. %, 23 vol. %, 24 vol. %, 25 vol. %, 26 vol. %, 27 vol. %, 28 vol. %, 29 vol. %, 30 vol. %, 31 vol. %, 32 vol. %, 33 vol. %, 34 vol. %, 35 vol. %, 36 vol. %, 37 vol. %, 38 vol. %, 39 vol. %, 40 vol. %, 41 vol. %, 42 vol. %, 43 vol. %, 44 vol. %, 45 vol. %, 46 vol. %, 47 vol. %, 48 vol. %, 49 vol. %, or 50 vol. %.

In certain aspects, the end closure liner provides a product shelf life of up to about four years (e.g., up to about 6 months, up to about 12 months, up to about 18 months, up to about 24 months, up to about 36 months, or up to about 48 months). For example, the end closure liner as described herein provides a product shelf life of up to about 1 month, 2 months, 3 months, 4 months, 5 months, 6 months, 7 months, 8 months, 9 months, 10 months, 11 months, 12 months, 13 months, 14 months, 15 months, 16 months, 17 months, 18 months, 19 months, 20 months, 21 months, 22 months, 23 months, 24 months, 25 months, 26 months, 27 months, 28 months, 29 months, 30 months, 31 months, 32 months, 33 months, 34 months, 35 months, 36 months, 37 months, 38 months, 39 months, 40 months, 41 months, 42 months, 43 months, 44 months, 45 months, 46 months, 47 months, or 48 months. In some cases, the end closure liner is suitable for products that are consumed as soon as accessible or shortly thereafter (e.g., products having a shelf life of less than 1 month, such as 0 months).

Process for Making

In some non-limiting examples, a laminated end closure can be produced using a process as described herein. The process can be performed on one or more sides of the end closure to result in an end closure that is advantageously laminated on at least a product facing side. As described herein, in some cases the end closure can include a product-facing side that is laminated using the process disclosed herein and a consumer-facing side that is lacquered using standard lacquering techniques. The process can include the steps of (1) providing a metal container body (e.g., a metal container body having a product facing body side coated with a protective layer, such as a spray on coating, a laminated film, a chemical vapor deposited liner, a physical vapor deposited liner, an applicator applied liner, or any combination thereof), (2) providing an end closure stock, wherein the end closure stock comprises a product facing closure side, and a consumer facing closure side, (3) laminating the product facing closure side of the end closure stock with a polymer film, (4) forming an end closure from the end closure stock, and (5) sealing the body with the end closure to provide a sealed metal container. In certain examples, the process provides an air-tight closure for the metal container (e.g., a closure having an air leak rate of less than about $10^{-6}$ millibar-liters per second (mbar l/s), less than about $10^{-5}$ mbar l/s, less than about $10^{-4}$ mbar l/s, less than about $10^{-3}$ mbar l/s, less than about $10^{-2}$ mbar l/s, less than about $10^{-1}$ mbar l/s, or anywhere in between).

Cleaning

In some aspects, the process can include cleaning the end closure stock before coating. In some cases, the end closure stock is cleaned with an acid treatment. For example, the cleaning process can include an acid treatment comprising sulfuric acid ($H_2SO_4$), hydrofluoric acid (HF), phosphoric acid ($H_3PO_4$), nitric acid ($HNO_3$), hydrochloric acid (HCl), hydrobromic acid (HBr), perchloric acid ($HClO_4$), hydroiodic acid (HI), boric acid ($H_3BO_3$), and/or any combination thereof. In some cases, the end closure stock is cleaned with an alkaline (i.e., a base) treatment. For example, the cleaning process can include an alkaline treatment comprising sodium hydroxide (NaOH), potassium hydroxide (KOH), calcium hydroxide ($Ca(OH)_2$), or any combination thereof. In some cases, the end closure stock is cleaned with an alkaline organic compound (i.e., an organic base) treatment. For example, the cleaning process can include an organic base treatment comprising barium tert-butoxide ($C_8H_{18}BaO_2$), choline hydroxide ($C_5H_{15}NO_2$), diethylamine ($C_4H_{11}N$), dimethylamine ($C_2H_7N$), ethylamine ($C_2H_7N$), methylamine ($CH_5N$), piperidine ($C_5H_{11}N$), and/or any combination thereof. This cleaning treatment can reduce and/or remove any aluminum oxide or hydroxide layers on the surface of the end closure stock (e.g., an aluminum alloy strip).

Optional Pretreating

Optionally, the process can include pre-treating the end closure stock with a conversion layer. In some cases, this conversion layer can include compounds of trivalent chromium (Cr(III)) and phosphates. In some cases, this conversion layer can include compounds of titanium and zirconium (Ti/Zr). This optional conversion layer can provide enhanced adhesion, low blushing after pasteurization, and resistance to corrosion when exposed to acids, such as acetic acid or citric acid. In some cases, the end closure stock can include one or more optional conversion layers located on the product side (e.g., an interior-facing side) and/or the consumer side (e.g., an exterior-facing side).

Optionally, the process can further include applying an adhesion promoter to the end closure stock. The adhesion promoter can provide enhanced adhesion in optional downstream coating steps. Adhesion promoters suitable for use in this process include silane-based chemistries, titanium/zirconium (Ti/Zr) based chemistries, and polymer-based chemistries. The adhesion promoter can be applied by dip coating, bar coating, roll coating, spin coating, spray coating, screen coating, drop coating, or using any other suitable coating technique. If the end closure stock is pre-treated with a conversion layer, the end closure stock pre-treated with the conversion layer can be further coated with the adhesion promoter as described above.

Laminating

In some examples, the process further includes a step of laminating the end closure stock optionally coated with the adhesion promoter and optionally pre-treated with the conversion layer. In some cases, the end closure stock is not pre-treated with the adhesion promoter and/or the conversion layer. The laminating step can include heating a polymer film to a temperature such that the polymer film is soft and tacky, applying the heated polymer film to at least a product facing side of the end closure stock, and heating the combined end closure stock and polymer film, optionally to an annealing temperature such that the polymer film can be at least partially viscous and wet the product facing side of the end closure stock. In some examples, the polymer film can include polyesters, epoxies, polyurethanes, polyvinyls, polyacrylics, polyamides, polyolefins, and silicones. For example, the polymer film can be polyethylene terephthalate (PET). Optionally, the polymer film can be a monolayer, or can consist of multiple layers of different polymers with or without various fillers and additives (e.g., colorants). In some cases, the polymer film can be PET that includes additional comonomers (e.g., isophthalic acid).

In some cases, the end closure stock and/or polymer film can be heated to temperature such that the polymer film can be at least partially viscous and wet the product facing side of the end closure stock, which can improve film adhesion sufficiently to provide increased performance. For example, the end closure stock can be heated such that when the polymer film contacts the end closure stock, heat is transferred to the polymer film, thus heating the polymer film. In some cases, the polymer film is heated prior to contacting the end closure stock such that it is at least partially viscous prior to contacting the end closure stock. In certain aspects, the end closure stock and polymer film are both heated prior to contacting the polymer film to the end closure stock.

Laminating at temperatures near or above the melting temperature of the polymer film allows the film to flow into the topography of the end closure stock (i.e., the polymer film wets the end closure stock), including any optional conversion layer(s) and/or optional adhesion promoters. Thus, adhesion between the end closure stock and the polymer film is improved through mechanical bonding, van der Waals forces, polar-polar interactions, or any suitable mechanism initiated by intimate contact between the end closure stock, optional conversion layer and/or optional adhesion promoter layer, and the polymer film to be laminated onto the end closure stock. In some examples, the end closure stock and/or polymer film is heated to a temperature of at least 200° C. (e.g., from about 200° C. to about 280° C.) after the polymer film is applied. For example, the end closure stock can be heated to a temperature from about 210° C. to about 280° C., from about 215° C. to about 280° C., from about 220° C. to about 275° C., from about 225° C. to about 270° C., from about 230° C. to about 265° C., from about 235° C. to about 275° C., from about 240° C. to about 270° C., from about 245° C. to about 265° C., or from about 250° C. to about 260° C. For example, the end closure stock can be heated to about 200° C., 201° C., 202° C., 203° C., 204° C., 205° C., 206° C., 207° C., 208° C., 209° C., 210°

C., 211° C., 212° C., 213° C., 214° C., 215° C., 216° C., 217° C., 218° C., 219° C., 220° C., 221° C., 222° C., 223° C., 224° C., 225° C., 226° C., 227° C., 228° C., 229° C., 230° C., 231° C., 232° C., 233° C., 234° C., 235° C., 236° C., 237° C., 238° C., 239° C., 240° C., 241° C., 242° C., 243° C., 244° C., 245° C., 246° C., 247° C., 248° C., 249° C., 250° C., 251° C., 252° C., 253° C., 254° C., 255° C., 256° C., 257° C., 258° C., 259° C., 260° C., 261° C., 262° C., 263° C., 264° C., 265° C., 266° C., 267° C., 268° C., 269° C., 270° C., 271° C., 272° C., 273° C., 274° C., 275° C., 276° C., 277° C., 278° C., 279° C., or 280° C.

After heating, the end closure stock and/or polymer film can be maintained at the temperature of at least 200° C. to about 280° C. for about 1 second to about 30 seconds (e.g., from about 5 seconds to about 25 seconds, from about 10 seconds to about 20 seconds, from about 5 seconds to about 30 seconds, or from about 10 seconds to about 30 seconds). For example, the end closure stock and/or polymer film can be maintained at the temperature of at least 200° C. to about 280° C. for about 1 second, about 2 seconds, about 3 seconds, about 4 seconds, about 5 seconds, about 6 seconds, about 7 seconds, about 8 seconds, about 9 seconds, about 10 seconds, about 11 seconds, about 12 seconds, about 13 seconds, about 14 seconds, about 15 seconds, about 16 seconds, about 17 seconds, about 18 seconds, about 19 seconds, about 20 seconds, about 21 seconds, about 22 seconds, about 23 seconds, about 24 seconds, about 25 seconds, about 26 seconds, about 27 seconds, about 28 seconds, about 29 seconds, or about 30 seconds.

In some non-limiting examples, the laminated end closure stock is passed directly from a lamination process into an annealing process (e.g., into an annealing furnace). In some cases, the laminated end closure stock is passed directly from a lamination process into a lacquer application system and then into an annealing process (e.g., into an annealing furnace). In some cases, annealing is not performed.

Forming and Sealing

In some cases, the end closure stock can be formed into any suitable shape closure. For example, the end closure stock can be formed into an easy open closure (e.g., a ring pull closure), a peel off closure (e.g., a thin foil closure), a beverage closure, a penny lever closure (e.g., a drum closure, or a paint can closure), a sanitary closure (e.g., a closure opened by cutting with, for example, a can opener), an aerosol valve cap closure, a resealable closure, a bottle rolled-on pilfer proof closure, any suitable container end closure, or any combination thereof, providing a laminated end closure.

In some examples, the laminated end closure is attached to a previously prepared container body (e.g., a previously formed and coated container body). Attaching the end closure encloses the product within the container. As described herein, the container body is configured to receive the end closure, wherein a product side of the container body contacts the laminated polymer film on the product side of the end closure, thus providing the end closure liner.

Optionally, the sealed container is annealed to bond the laminated polymer film on the product side of the container body to the laminated polymer film on the product side of the end closure. For example, the end closure can be laminated with a lower melting point polymer film (e.g., a polyamide film having a melting point of about 140° C.), and the sealed container can be heated to an annealing temperature (e.g., 130° C. in the present example) such that the laminated polymer film on the product side of the end closure can at least partially flow and bond to a coating on the product facing side of the container body. Bonding the laminated polymer film on the product side of the end closure to, for example, a laminated polymer film on the product side of the container body provides the end closure liner described herein.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art. The following examples will serve to further illustrate the present invention without, at the same time, however, constituting any limitation thereof. On the contrary, it is to be clearly understood that resort may be had to various embodiments, modifications and equivalents thereof which, after reading the description herein, may suggest themselves to those skilled in the art without departing from the spirit of the invention.

Illustrations

Illustration 1 is a container, comprising: a body comprising a sealable opening, a product facing body side, and a consumer facing body side; and an end closure comprising a product facing closure side and a consumer facing closure side, wherein the sealable opening is configured to receive the end closure, wherein the product facing closure side comprises a laminated film, and wherein the laminated film on the product facing closure side contacts the product facing body side providing an end closure liner.

Illustration 2 is the container of any preceding or subsequent illustration, wherein the container comprises a beverage can, a bottle, a food storage can, an aerosol can, or a chemical storage can.

Illustration 3 is the container of any preceding or subsequent illustration, wherein the container is a metal container comprising aluminum, an aluminum alloy, magnesium, a magnesium-based material, titanium, a titanium-based material, copper, a copper-based material, steel, a steel-based material, bronze, a bronze-based material, brass, a brass-based material, or any combination thereof.

Illustration 4 is the container of any preceding or subsequent illustration, wherein the body comprises a spray on liner, a laminated liner, a chemical vapor deposited liner, a physical vapor deposited liner, an applicator applied liner, or any combination thereof.

Illustration 5 is the container of any preceding or subsequent illustration, wherein the end closure comprises an easy open closure, a peel off closure, a beverage closure, a penny lever closure, a sanitary closure, an aerosol valve cap closure, a ring pull closure, a resealable closure, or any combination thereof.

Illustration 6 is the container of any preceding or subsequent illustration, wherein the end closure is configured to engage the sealable opening.

Illustration 7 is the container of any preceding or subsequent illustration, wherein the laminated film comprises a natural polymer, a synthetic polymer, or any combination thereof.

Illustration 8 is the container of any preceding or subsequent illustration, wherein the end closure liner is up to 500 microns thick.

Illustration 9 is the container of any preceding or subsequent illustration, wherein the end closure liner is from 6 microns thick to 40 microns thick.

Illustration 10 is the container of any preceding or subsequent illustration, wherein the end closure liner is from 8 microns thick to 15 microns thick.

Illustration 11 is the container of any preceding or subsequent illustration, wherein the end closure liner is resistant to materials having a pH of from 1 to 14.

Illustration 12 is the container of any preceding or subsequent illustration, wherein the container provides a product shelf life of up to four years.

Illustration 13 is a method for preparing a container having an end closure liner according to any preceding or subsequent illustration, comprising: providing a body comprising a sealable opening, a product facing body side, and a consumer facing body side; providing an end closure stock, wherein the end closure stock comprises a product facing closure side, and a consumer facing closure side; laminating the product facing closure side of the end closure stock with a polymer film; forming an end closure from the end closure stock; and sealing the body with the end closure to provide a sealed container.

Illustration 14 is the method of any preceding or subsequent illustration, wherein the polymer film comprises a polyester film.

Illustration 15 is the method of any preceding or subsequent illustration, wherein the polymer film comprises a polyethylene terephthalate (PET) film.

Illustration 16 is the method of any preceding or subsequent illustration, wherein laminating the product facing closure side of the end closure stock with the polymer film comprises laminating a polyethylene terephthalate film to the product facing closure side of the end closure stock.

Illustration 17 is the method of any preceding or subsequent illustration, wherein laminating the product facing closure side of the end closure stock with a polymer film comprises: heating the polymer film to a temperature of at least 200° C.; contacting the product facing closure side of the end closure stock with the polymer film; and maintaining the polymer film at the temperature of at least 200° C. for 1 second to 30 seconds.

Illustration 18 is the method of any preceding or subsequent illustration, wherein forming the end closure from the end closure stock comprises forming an easy open closure, a peel off closure, a beverage closure, a penny lever closure, a sanitary closure, an aerosol valve cap closure, a ring pull closure, a resealable closure, a bottle rolled-on pilfer proof closure, or any combination thereof.

Illustration 19 is the method of any preceding or subsequent illustration, wherein sealing the body with the end closure comprises contacting the polymer film with the body.

Illustration 20 is the method of any preceding or subsequent illustration, wherein contacting the polymer film with the body provides an air-tight closure.

Illustration 21 is the method of any preceding or subsequent illustration, further comprising annealing the sealed container, wherein annealing the sealed container comprises raising a temperature of the polymer film for a duration sufficient to melt the polymer film into a surface texture of the container.

Illustration 22 is the method of any preceding or subsequent illustration, wherein annealing the sealed container includes raising a temperature of the polymer film to at least 230° C.

Illustration 23 is the method of any preceding illustration, wherein annealing the sealed container bonds the polymer film of the body to the polymer film of the end closure.

All patents, publications, and abstracts cited above are incorporated herein by reference in their entireties. Various embodiments of the invention have been described in fulfillment of the various objectives of the invention. It should be recognized that these embodiments are merely illustrative of the principles of the present invention. Numerous modifications and adaptions thereof will be readily apparent to those skilled in the art without departing from the spirit and scope of the present invention as defined in the following claims.

What is claimed is:

1. A container, comprising:
   a body comprising a sealable opening, a product facing body side, and a consumer facing body side; and
   an end closure comprising a product facing closure side and a consumer facing closure side,
   wherein the sealable opening is configured to receive the end closure,
   wherein the product facing closure side comprises a laminated film,
   wherein the consumer facing closure side is:
   1) an aluminum end stock, or
   2) an aluminum end stock coated with a conversion layer comprising titanium,
   zirconium, compounds of trivalent chromium (Cr(III)) and phosphates, and combinations thereof, and
   wherein the laminated film on the product facing closure side contacts the product facing body side providing an end closure liner; and
   wherein the container is a metal container comprising aluminum, an aluminum alloy, magnesium, a magnesium-based material, titanium, a titanium-based material,
   copper, a copper-based material, steel, a steel-based material, bronze, a bronze-based material, brass, a brass-based material, or any combination thereof.

2. The container of claim 1, wherein the container is a beverage can, a bottle, a food storage can, an aerosol can, or a chemical storage can.

3. The container of claim 1, wherein the body is a spray on liner, a laminated liner, a chemical vapor deposited liner, a physical vapor deposited liner, an applicator applied liner, or any combination thereof.

4. The container of claim 1, wherein the end closure is an easy open closure, a peel off closure, a beverage closure, a penny lever closure, a sanitary closure, an aerosol valve cap closure, a ring pull closure, a resealable closure, a bottle rolled-on pilfer proof closure, or any combination thereof.

5. The container of claim 1, wherein the end closure is configured to engage the sealable opening.

6. The container of claim 1, wherein the laminated film comprises a natural polymer, a synthetic polymer, or any combination thereof.

7. The container of claim 1, wherein the end closure liner is up to 500 microns thick.

8. The container of claim 7, wherein the end closure liner is from 6 microns thick to 40 microns thick.

9. The container of claim 7, wherein the end closure liner is from 8 microns thick to 15 microns thick.

10. The container of claim 1, wherein the end closure liner is resistant to materials having a pH of from 1 to 14.

11. The container of claim 1, wherein the container provides a product shelf life of up to four years.

12. A method for preparing a container having an end closure liner, comprising:
    providing a body comprising a sealable opening, a product facing body side, and a consumer facing body side;
    providing an end closure stock, wherein the end closure stock comprises a product facing closure side, and a consumer facing closure side;

laminating the product facing closure side of the end closure stock with a polymer film;

forming an end closure from the end closure stock; and sealing the body with the end closure to provide a sealed container, wherein the consumer facing closure side is:

1) an aluminum end stock, or 2) an aluminum end stock coated with a conversion layer comprising titanium, zirconium, compounds of trivalent chromium (Cr(III)) and phosphates, and combinations thereof.

13. The method of claim 12, wherein the polymer film comprises a polyester film.

14. The method of claim 13, wherein the polyester film comprises a polyethylene terephthalate (PET) film.

15. The method of claim 12, wherein laminating the product facing closure side of the end closure stock with the polymer film comprises:

heating the polymer film to a temperature of at least 200° C.;

contacting the product facing closure side of the end closure stock with the polymer film; and maintaining the polymer film at the temperature of at least 200° C. for 1 second to 30 seconds.

16. The method of claim 12, wherein forming the end closure from the end closure stock comprises forming an easy open closure, a peel off closure, a beverage closure, a penny lever closure, a sanitary closure, an aerosol valve cap closure, a ring pull closure, a resealable closure, a bottle rolled-on pilfer proof closure, or any combination thereof.

17. The method of claim 12, wherein sealing the body with the end closure comprises contacting the polymer film with the body.

18. The method of claim 17, wherein contacting the polymer film with the body provides an air-tight closure.

19. The method of claim 12, further comprising annealing the sealed container, wherein annealing the sealed container comprises raising a temperature of the polymer film for a duration sufficient to melt the polymer film into a surface texture of the sealed container.

* * * * *